United States Patent
Bauer et al.

(10) Patent No.: US 9,652,326 B1
(45) Date of Patent: May 16, 2017

(54) INSTANCE MIGRATION FOR RAPID RECOVERY FROM CORRELATED FAILURES

(71) Applicant: Amazon Technologies, Inc., Reno, NV (US)

(72) Inventors: Jean-Paul Bauer, Seattle, WA (US); Marc Nevin Daya, Western Cape (ZA); Jaco Hermanus Gabriel Le Roux, Western Cape (ZA); Kevin Robert Scaife, Western Cape (ZA); Laban Mwangi Kimotho, Western Cape (ZA); Brian Modra, Seattle, WA (US); Alan Roy Powell, Western Cape (ZA)

(73) Assignee: Amazon Technologies, Inc., Reno, NV (US)

( * ) Notice: Subject to any disclaimer, the term of this patent is extended or adjusted under 35 U.S.C. 154(b) by 78 days.

(21) Appl. No.: 14/163,906

(22) Filed: Jan. 24, 2014

(51) Int. Cl.
  *G06F 11/00* (2006.01)
  *G06F 11/14* (2006.01)

(52) U.S. Cl.
  CPC ................ *G06F 11/1412* (2013.01)

(58) Field of Classification Search
  CPC ............ G06F 11/1412; G06F 11/2038; G06F 11/2028; G06F 11/2097; G06F 11/2035; G06F 11/2025
  USPC .......................................................... 714/13
  See application file for complete search history.

(56) References Cited

U.S. PATENT DOCUMENTS

| | | | |
|---|---|---|---|
| 8,127,296 B2 | 2/2012 | Khatri et al. | |
| 8,156,490 B2 | 4/2012 | Bozek et al. | |
| 8,407,702 B2 | 3/2013 | Ikegaya et al. | |
| 8,438,565 B2 | 5/2013 | Ikegaya et al. | |
| 8,473,566 B1* | 6/2013 | Cardente | G06F 3/061 370/252 |
| 8,539,488 B1 | 9/2013 | Havemose | |
| 8,566,825 B2 | 10/2013 | Bozek et al. | |
| 8,607,252 B2 | 12/2013 | Bernardes et al. | |
| 2009/0031307 A1* | 1/2009 | Chodroff et al. | 718/100 |
| 2011/0004735 A1* | 1/2011 | Arroyo et al. | 711/162 |

(Continued)

FOREIGN PATENT DOCUMENTS

WO  2013041728  3/2013

OTHER PUBLICATIONS

U.S. Appl. No. 14/658,965, filed Mar. 16, 2015, Weili Zhong McClenahan.

*Primary Examiner* — Yair Leibovich
(74) *Attorney, Agent, or Firm* — Robert C. Kowert; Meyertons, Hood, Kivlin, Kowert & Goetzel, P.C.

(57) ABSTRACT

Methods and apparatus for instance migration to support rapid recovery from correlated failures are described. A failure event affecting one or more compute instances of a provider network, including a particular compute instance hosted at a first instance host, is detected based on an analysis of health status information. A determination is made as to whether a particular compute instance meets an acceptance criterion for a failure-induced migration. The acceptance criterion may be based on storage-related requests from the particular compute instance. If the particular compute instance meets the acceptance criterion, one or more configuration operations are initiated to re-launch the particular compute instance at a different instance host.

20 Claims, 9 Drawing Sheets

(56) References Cited

U.S. PATENT DOCUMENTS

| | | | |
|---|---|---|---|
| 2012/0243795 A1* | 9/2012 | Head | H04N 19/507 |
| | | | 382/218 |
| 2013/0111471 A1* | 5/2013 | Chandrasekaran | 718/1 |
| 2013/0166504 A1 | 6/2013 | Varkhedi et al. | |
| 2013/0297964 A1 | 11/2013 | Hegdal et al. | |
| 2015/0052179 A1* | 2/2015 | Novick | G06F 17/30194 |
| | | | 707/827 |
| 2015/0178330 A1* | 6/2015 | March | G06F 17/30309 |
| | | | 707/638 |

* cited by examiner

INSTANCE MIGRATION FOR RAPID RECOVERY FROM CORRELATED FAILURES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine or host to be shared among multiple users by providing each user with one or more virtual machines hosted by the single physical computing machine. Such virtual machines may be considered the equivalent of software simulations of distinct logical computing systems, providing users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

Many providers of cloud-based infrastructure have implemented vary large data centers with thousands of physical hosts, typically using commodity hardware, with many or all of the hosts arranged or mounted in rack configurations. As the number of hosts and racks in a given provider's fleet grows, the absolute number of failures of various kinds that are encountered in a given interval, including software failures, hardware failures, power supply-related failures, and the like, may increase simply as a result of the larger total population of devices in the fleet. At the same time, users of such environments have come to expect very high availability levels for the applications built using the cloud-based infrastructure. The impact on the availability or uptime of the virtual machines may vary by the type of failure. Since a given rack may hold tens or dozens of hosts or devices, a rack-level failure event (for example a network switch failure or a failure of a power distribution unit) may result in correlated outages of large numbers of virtual machines at the hosts mounted on the rack. The negative consequences of such correlated failures may be exacerbated by fact that it may in some cases take operator intervention to diagnose and fix the failure, and as a result the down time for the affected virtual machines may reach unacceptable levels for many applications and users.

Figure 1:
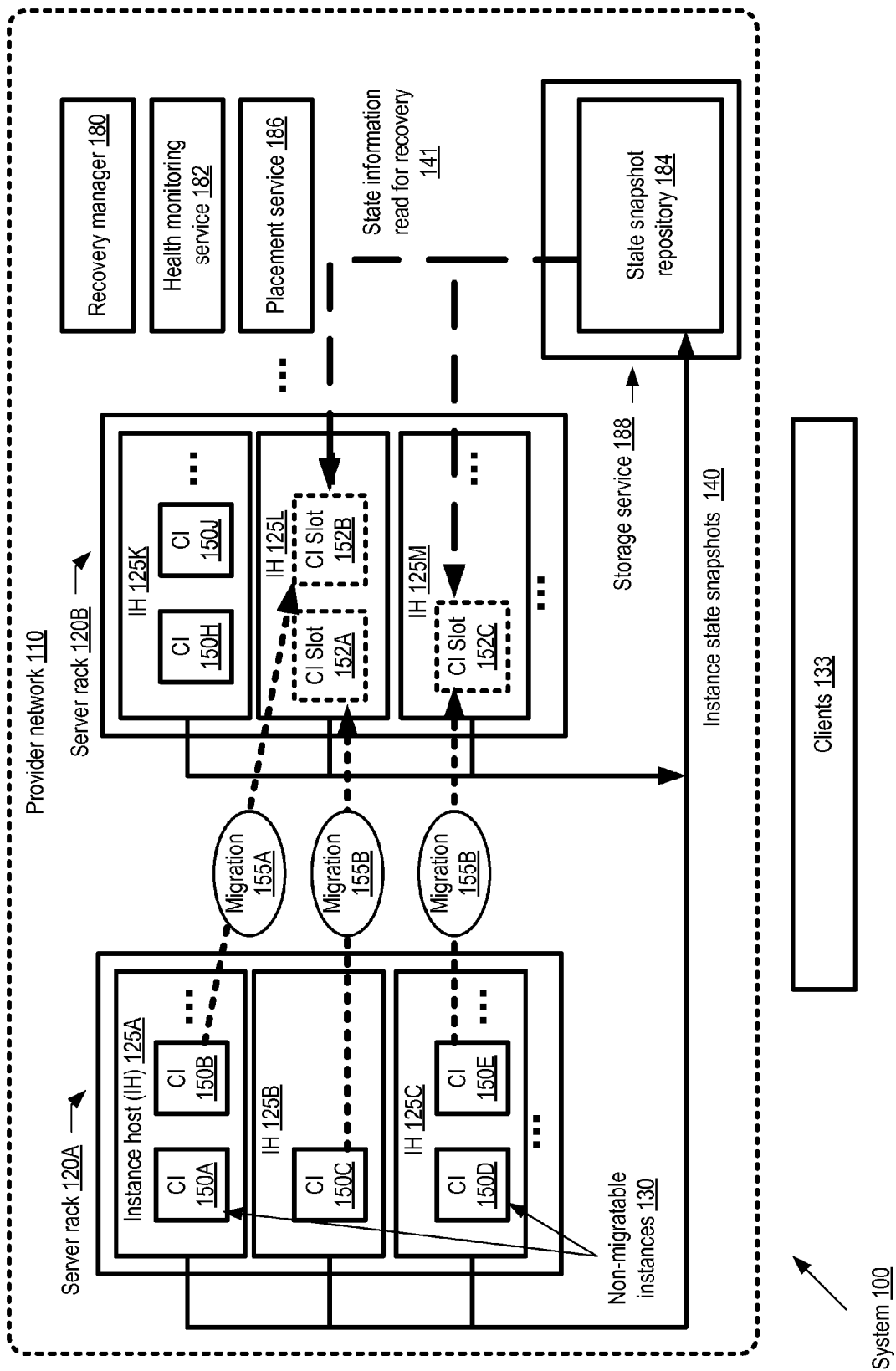
FIG. 1 illustrates an example system environment in which, in response to a detection of a rack-level failure at a provider network, compute instances hosted at that rack may be migrated to instance hosts mounted at one or more different racks, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for migration of compute instances to enable rapid recovery from correlated failures in a provider network environment are described. Networks set up by an entity such as a company or a public sector organization to provide one or more services (such as various types of multi-tenant and/or single-tenant cloud-based computing or storage services) accessible via the Internet and/or other networks to a distributed set of clients or customers may be termed provider networks in this document. The term "multi-tenant" may be used herein to refer to a service that is designed to implement application and/or data virtualization in such a manner that different client entities are provided respective customizable, isolated views of the service, such that one client to whom portions of the service functionality are being provided using a given set of underlying resources may not be aware that the set of resources is also being used for other clients. A provider network may support single-tenant services (such as for private cloud implementations) in some embodiments, either in addition to, or instead of, multi-tenant services. A given provider network may typically include several large data centers hosting various resource pools, such as collections of physical and/or virtualized computer servers, storage devices, networking equipment and the like, needed to implement, configure and distribute the infrastructure and services offered by the provider.

In some provider networks, the physical computing devices (such as commodity computer servers or hosts) being used to implement one or more network-accessible services may be arranged in server racks. Each server rack may comprise an enclosure in which numerous (e.g., up to dozens) of computing devices are physically attached or mounted, together with supporting infrastructure elements shared among the computing devices, such as power distribution units (PDUs), network switches, security management equipment, and the like. A failure at some of the shared infrastructure components of a rack may result in an outage of the services and applications being implemented at all (or at least a large subset) of the computing devices. For example, a virtual computing service of the provider network may provide clients with virtual machines or "compute instances" hosted at rack-mounted computer servers called "instance hosts" in some embodiments. Compute instances may also simply be referred to herein as "instances". In one example configuration, as many as 36 instance hosts may be mounted on a single rack, and each instance host may be used to implement up 8 compute instances of a specified performance capability level. In such a scenario, if some shared component that is required for the normal functionality of the instance hosts fails, up to 288 compute instances may be affected (depending on how many instances were in use at the time of the failure). Such correlated failures may be caused by any of several different types of hardware, firmware or software faults—e.g., in the power supply or cooling infrastructure, the networking infrastructure, the security infrastructure, the mechanical components of the rack, and so on. Depending on the number of instances launched at a given host, a hardware or firmware failure at a given instance host may also constitute a correlated failure event for which recovery operations similar to those used for rack-level failure events may be undertaken. In some cases, manual intervention may be needed to recover from such failure events—e.g., a member of a support staff team may have to perform a diagnosis, replace a hardware component or board, ensure that cables and components are securely attached, run diagnostic tests to verify that the affected components are working correctly, and so on. The total time taken to fully recover from some such events may consequently approach one or more hours in some environments.

Many provider networks have established elaborate health monitoring services, configured to track the status and availability of various hardware and software devices distributed across the networks, and thereby to detect and recover from failures as quickly as possible. For example, with respect to compute instances, a number of "heartbeat" monitors may be configured in some embodiments as part of the health monitoring service, each of which periodically transmits a short network message to a set of compute instances and measures the time taken to receive a response. If no response is received from a given compute instance to some selected number of heartbeat messages (e.g., three consecutive heartbeat messages) during a threshold time period (e.g., thirty seconds), the given compute instance may be determined to be in an unhealthy or failed state in some implementations. Such instance failures may often occur at random times and at random locations within the provider network, e.g., due to software bugs. In order to distinguish between such random instance failures and a correlated or rack-level failure event that affects a substantial number of instances, the heartbeat responses may have to be analyzed in conjunction with instance placement information. If the set of instance hosts on a given rack currently hosts N compute instances expected to be up and running, and analysis of the heartbeat data collected from the N instances indicates that some unusually large fraction of the N instances are not responsive, this may indicate that the probability of a rack-level failure is high.

In order to reduce the instance downtime associated with rack-level failures (or correlated failures in general), in some embodiments, a failure-induced migration policy may be implemented. According to such a policy, one or more acceptance criteria may be defined to determine whether a given compute instance can be re-launched, within a reasonable time window, at a different instance host at a different rack than where the instance was executing initially, so that the operations being performed at the instance on behalf of a client can be resumed with a minimal delay. The acceptance criteria may be based at least in part on an analysis of the storage-related requests or accesses associated with the instance in some embodiments. In one embodiment, evaluating the criteria may involve an identification/classification of the types of storage devices to which write requests (comprising state information potentially relevant to a re-launch) are directed from the instance. Re-launching of a compute instance may, for example, involve setting up the required components of the execution environment, reproducing operating system and/or application state information for the instance, and re-booting or restarting the instance in various embodiments. As described below in further detail, in some embodiments evaluating the acceptance criteria may include determining whether the given compute instance had stored state information at a local storage device (e.g., a local disk) at its original instance host, and if so, whether the state information can be retrieved from a different storage location unaffected by the failure. If a compute instance is deemed acceptable for a failure-induced migration, one or more administrative components of the provider network, including for example a recovery manager, may select an appropriate target instance host at a rack unaffected by the failure at which an unused "instance slot" (representing sufficient unused computing, memory, storage and/or other resources) is available, perform the necessary pre-requisite configuration steps at the target instance host, and re-launch the instance at the target instance host. If a compute instance does not meet the acceptance criteria, migration may not be attempted for it in at least some embodiments—e.g., the instance may eventually be re-started when the repair operations needed to respond to the failure event have been completed. From the perspective of the provider network operator and the virtual computing service, the failure-induced migration policy may be employed in a best-effort approach towards reducing instance downtime. Thus, in one exemplary scenario, the goal may be to reduce average instance downtime related to rack-level or correlated failures from "on the order of an hour" to "on the order of a few minutes".

It is noted that if multiple instances of a given rack meet the criteria for failure-induced migration, in at least some embodiments, not all such instances may be re-launched at the same destination rack, and not all of the instances that were running on a particular instance host may be re-launched at a single instance host. Thus, various instance placement mappings may change as a result of the implementation of the failure-induced migration policy in such embodiments. For example, any combination of the following may be modified as part of migration-based recovery: the mappings between compute instances and instance hosts, the total number of instance hosts among which the affected instances are re-launched, the number of racks among which the instances are re-launched, and/or the mappings between the instance hosts used and the racks used.

In at least some embodiments, compute instances may fall into one of two categories with respect to saving instance state information that may be required or useful in re-launching the instance: either the instances do not use local storage devices at their instance hosts for state information, or they do save state information to local storage devices. Such state information may include, for example configuration information or metadata pertaining to file systems, networking devices, attached remote storage devices and the like. In some cases application configuration information may also be required for a successful re-launch of an instance from a client perspective. In some embodiments, data (such as contents of various client-created files or operating system files) may also be considered part of the state information If a compute instance does not use local storage to save state information, state information that is needed for re-launching the compute instance (if any state information is needed at all) may typically be obtained from a storage location unaffected by the rack-level failure, such as a node of a network-accessible storage service. Accordingly, a compute instance that does not use local storage for state information may be deemed to meet the acceptance criteria for failure-induced migration in at least some embodiments.

The provider network operator may also wish to reduce downtime for instances that do save state information at local disks (or other local storage devices) of the instance hosts, to the extent possible. In order to do so, in at least some embodiments an instance state snapshot generation technique may be employed. According to such a technique, a sequence of snapshots (point-in-time copies) of at least a portion of the contents of local storage devices modified from the compute instances may be created at some remote storage location, e.g., by a snapshot manager component of the provider network. For example, a snapshot creation schedule may be set up, and in accordance with the schedule local storage device contents may be copied to one or more remote storage devices of network-accessible storage service implemented at the provider network. The snapshot creation schedule may be dynamically modified based on various factors in some embodiments, so that in some cases the time intervals between successive snapshots may vary as described below in further detail. If, at the time that the rack-level failure is detected, a snapshot that comprises up-to-date state information for an affected compute instance exists, such a snapshot may be used to re-launch the instance, e.g., by copying at least some subset of the snapshot contents to a storage device that can be accessed from the re-launched instance. It may also be the case, for some instances, that state information has been written to local storage after the most recent snapshot was created. In the latter scenario, the most recent snapshot may not be valid for re-launch purposes, and failure-induced migration may not be attempted for the instance.

In some embodiments in which the snapshot generation technique is used, at least a subset of the writes directed to local storage from a compute instance may be intercepted and/or deferred before they are applied at the local storage device, so that snapshots at the remote storage device can be invalidated as needed. Consider a scenario in which a particular snapshot Snap1 of the state information on local storage device SD1 of a compute instance CI1 running on instance host IH1 is completed (saved to a remote storage device) at time T0. At time T1, a write request W1 directed to SD1, which may result in a modification of instance state information (and may hence render Snap1 invalid), is generated at CI1. In at least some embodiments, a write request generated by a compute instance at an instance host may have to be processed by one or more virtualization management software stack (VMSS) components at the instance host, such as for example a hypervisor and/or an administrative or privileged operating system instance running on the instance host, before corresponding changes are saved to the local storage device. The administrative operating system instance may be referred to as a "privileged domain" in some embodiments, and may be referred to herein as "dom0" (short for "domain zero").

According to one embodiment, the write request W1 may be intercepted at one of the VMSS components, and deferred until a notification can be sent to mark or designate Snap1 as invalid. If Snap1 were not marked as invalid before the modifications indicated in write request W1 are persisted to SD1, and a correlated failure affecting CI1 occurs before Snap1 is recognized as being out-of-date, a re-launch of CI1 may be attempted using now-obsolete state information contained in Snap1. As a result, inconsistent states, data loss or other types of errors may result at the re-launched instance. In some implementations, and depending on the nature of the programmatic interface being used for the write operation, the writes such as W1 may be intercepted by the hypervisor, and the notification to invalidate the existing snapshot may be transmitted by dom0 (e.g., after dom0 is informed about the interception by the hypervisor). The acknowledgement that the snapshot has been invalidated may be received, for example, by dom0 and passed on to the hypervisor in some implementations, or may be provided directly to the hypervisor in other implementations. By intercepting and delaying the write to physical storage until an acknowledgement is received that Snap1 has been designated as invalid, problematic or inconsistent re-launches may be avoided. After the acknowledgement is received, the write may be allowed to proceed, i.e., contents of the local storage device may be modified in accordance with W1. In some embodiments, writes targeted towards only a portion of the local storage device that is expected to contain state information may be intercepted; writes to temporary files or data objects that are not expected to be useful for successful re-launches may not be intercepted by the hypervisor or dom0 in such embodiments.

In at least some embodiments, e.g., as a performance optimization, write interceptions may be suspended (i.e., write may be allowed to proceed) during time intervals in which the latest snapshot created is known by the VMSS to be invalid (or if no snapshot exists yet). Continuing the above example, assume that the next snapshot Snap2 of the state information of CI1 is completed at time T2, and that one or both of the VMSS components are notified that Snap2 has been created. The VMSS components may maintain local metadata on the snapshots created for various compute instances of the instance host in at least some implementations, indicating when the snapshots are created (and are hence marked valid) and when the snapshots are invalidated. Writes that are requested from CI1 between T1 and T2 (a period in which no valid snapshot of CI1 state information is known by the VMSS to exist), and are directed towards the state information stored on SD1, may be allowed to proceed without requiring any notifications to be sent from the instance host in some implementations.

A number of different types of metadata and/or data may be included in the instance state information, and hence in the snapshots, in various embodiments. For example, the state information may include any combination of: a machine image used for the compute instance, contents of at least a portion of the root file system, metadata associated with network-attached devices accessed from the compute instance, networking configuration information, and/or application configuration information. In some embodiments, incremental snapshots may be created (e.g., only changes that have occurred to the state information since the previous snapshot was generated may be stored at the remote storage location), while in other embodiments, full snapshots of the state information may be created at least periodically. The snapshot schedule (e.g., the time interval between successive snapshots) may be modified from time to time in some embodiments, e.g., based at least in part on an analysis of one or more of: (a) detected patterns of write requests of the particular compute instance (b) workload levels of the instance host (c) utilizations of network paths to the remote storage device to be used for the next snapshot, or (d) workload metrics of the remote storage device.

Example System Environment

FIG. 1 illustrates an example system environment in which, in response to a detection of a rack-level failure at a provider network, compute instances hosted at that rack may be migrated to instance hosts mounted at one or more different racks, according to at least some embodiments. As shown, system 100 includes a plurality of server racks 120 at a provider network 110, such as racks 120A and 120B, at which virtual machines or compute instances (abbreviated as CIs) 150 are hosted on various physical computing devices called instance hosts 125. For ease of presentation, only two racks are shown, only a few instance hosts 125 are shown in each rack, and only a few compute instances are shown at each instance host 125, although in practice a given instance host may comprise many more CIs 150, a rack 120 may hold dozens of instance hosts, and a large provider network data center may comprise hundreds or thousands of racks 120. The compute instances 150 may each comprise a client-accessible instance of an operating system, at which applications may be run on behalf of clients 133. In addition to the compute instances, each instance host may also include various components of a virtualization management software stack (VMSS), such as a hypervisor and/or an administrative or privileged operating system instance that are together responsible for orchestrating the virtualization of the instance host's hardware components, e.g., by acting as intermediaries between the CIs 150 and the hardware, managing resource allocations for the CIs 150, and so on.

In server rack 150A, two CIs 150A and 150B are shown running at instance host 125A, CI 150C is shown at instance host 125B, and CIs 150D and 150E are shown running at instance host 125C. At server rack 150B, CIs 150H and 150J are shown at instance host 125K. At instance host 125L, two compute instance slots 152A and 152B are shown, and at instance host 125M, an instance slot 152C is illustrated. An instance slot 152 may correspond to available capacity (e.g., computing capacity, memory capacity, local storage capacity, network bandwidth capacity, and/or capacity with respect to other types of resources) that can be used to launch a compute instance. The maximum number of slots that can be populated at a given instance host may vary in some embodiments, depending for example on the hardware and software capabilities of the instance host, and on the performance requirements of the types of instances to be launched. In some provider networks, a number of different CI types may be supported, such as "small", "medium" and "large" instances, with different computing, memory, storage, networking and other resource specifications. A given instance host 125 that can support N large instances (and hence may be configured with N slots for large instances) may instead be able to support 2N medium instances and 4N small instances, for example, so the number and types of slots currently free at an instance host may vary. In the remainder of this document, recovery-related techniques are described for compute instances in general, without further discussion of instance types, since the recovery-related techniques may be used with little or no modification regardless of the number of types of compute instances supported in any given embodiment.

In system 100, a recovery manager 180 may be responsible for coordinating implementation of a failure-induced migration policy for rapid recovery of compute instances 150. The recovery manager may comprise one or more administrative or "control-plane" components of provider network 110, and may itself be implemented in a distributed fashion in at least some embodiments using various hardware and/or software elements. A health monitoring service 182 may be set up in the provider network, to track the status and responsiveness of various components of the network including the compute instances 150 located at the instance hosts 125 and the racks 120. A placement service 186 may be implemented in the provider network to select an appropriate CI slot at some instance host 125 when a decision is to be made as to where a given compute instance should be launched or re-launched. The recovery manager may utilize the functionality of the health monitoring service 182, the placement service 186, as well as other services of the provider network 110 such as storage service 188 as described below in at least some embodiments.

Health status information from the compute instances 150 may be collected, e.g. by the health monitoring service 182 and/or by components of the recovery manager 180. In some implementations, for example, a heartbeat mechanism may be used to determine the responsiveness of the instances to network messages transmitted from one or more heartbeat sources distributed around the provider network. The health monitoring information may be analyzed, e.g., to correlate information about unresponsive/unhealthy/failed compute instances with placement information indicating the specific racks at which the instances were launched, so that rack-level or other correlated failure events may be detected.

If the location information associated with the affected instances indicates that there is a high probability that a rack-level failure event has occurred, at least in some embodiments the recovery manager 180 may examine metadata about the affected instances to determine whether any of them meet the acceptance criteria for migration to another rack in accordance with the failure-induced migration policy. The criteria may be based in some embodiments at least in part on an analysis of storage-related operations requested from, or associated with, the compute instances. For example, if a given instance 150 does not store state information at local storage devices of its instance host 125, the instance may meet the acceptance criteria. Alternatively, in at least some embodiments, if a given instance does store state information at a local storage device of the instance host, and a copy of that state information is available at a location unaffected by the failure, such an instance may also meet the acceptance criteria. In one embodiment, failure-induced migration may be considered as an option even for uncorrelated failure events—e.g., if a failed or "unhealthy" instance meets the acceptance criteria, failure-induced migration may be attempted regardless of the number of other affected instances in the same rack.

In response to a determination that a particular CI 150 meets the acceptance criteria, a target instance host 125 to which the particular compute instance is to be migrated, mounted at a different server rack 120 of the provider network may be identified. For example, in one embodiment, the placement service 186 may be requested by the recovery manager 180 to identify an instance host with an available CI clot 152 that can be used. In the depicted example, a rack-level failure may have been detected at rack 120A. Of the five CIs shown in rack 120A, three (150B, 150C and 150E) have met the acceptance criteria, while the remaining two (150A and 150D) have failed to meet the acceptance criteria, and are hence labeled as non-migratable instances 130. With respect to CI 150B, migration 155A to CI slot 152B at instance host 125L of rack 120B may be orchestrated in the depicted embodiment by the recovery manager 180, e.g., by initiating a set of configuration operations and issuing a command to re-launch the CI. Similarly, for CI 150C, migration 155B to CI slot 152A at host 125L may be implemented, and for instance 150E, migration 155C to CI slot 152C at instance host 125M may be performed.

As indicated earlier, in at least some embodiments, not all the instances that meet the acceptance criteria for failure-induced migration may be re-launched at the same destination rack, and not all of the instances that were running on a particular instance host may be re-launched at a single instance host. Similarly, after the migration, a combination of instances may be re-launched at a single instance host, even though the corresponding pre-failure instances were running at different instance hosts. For example, in FIG. 1, CIs 150B and 150C were running at different instance hosts 125A and 125B respectively, and both are migrated to the same target instance host 125L. Any combination of the following may be modified as part of migration-based recovery in different embodiments: the mappings between compute instances and instance hosts, the total number of instance hosts among which the affected instances are re-launched, the number of racks among which the instances are re-launched, and/or the mappings between the instance hosts and the racks subsequent to the migration. In some implementations, depending on the availability of slots and racks, it may be possible to preserve some or all of the mappings—e.g., the same number of instance hosts may be used as were used before the failure, or a single rack may be used as a destination for all the instances that were running on one rack before the failure.

The nature and extent of the configuration steps that may have to be performed to re-launch a given CIs at a targeted instance host may differ, depending on the manner in which the CI's state information was managed at its original instance host. In order to support rapid recovery for those CIs that store state information locally on their instance host, a snapshot mechanism may be implemented in the depicted embodiment. A series of point-in-time snapshots of at least a portion of the contents of the local storage devices of some subset or all of the instance hosts 125 may be generated and stored in a state snapshot repository 184, as indicated by label "instance state snapshots 140" in FIG. 1. For those instances whose re-launch requires state information stored in corresponding snapshots, the state information may be read from the repository, e.g., into memory or storage at the target instance hosts 125, as indicated by the label "state information read for recovery" 141. Some CI re-launches may not require any snapshots to be read in at least some embodiments, e.g., it may be possible to migrate and re-launch CIs that do not save any state information on local storage without reading or copying information from the repository 184. In some embodiments, a network-accessible storage service 188 of the provider network 110 may be used for the snapshot repository. In other embodiments, a database service (not shown in FIG. 1) may be used for the snapshots.

In some embodiments in which a snapshot technique similar to that described above is utilized, virtualization management software at the instance hosts may be configured to intercept write requests before the corresponding changes are made persistent on local storage devices, so that previously-generated snapshots that would be rendered obsolete by the write are invalidated. If such an earlier-generated snapshot were used to support a re-launch instead of being invalidated, the corresponding re-launched instance may enter an inconsistent state, e.g., because the effects of the write requests would be lost. Further details regarding such write interceptions are provided below in conjunction with the discussion of FIG. 9.

In at least some embodiments, an instance duplication prevention policy may be implemented, so that two different re-launches corresponding to the same pre-failure compute instance are prevented. For example, consider a scenario in which a rack-level failure event occurs due to a fault in a network switch used for a rack 120A. In accordance with the failure-induced migration policy described above, CI 150B that was running on an instance host mounted at rack 120A may be re-launched at a target instance host at a different rack 120B. At the same time, another CI 150A that was running at rack 120A may not have met the acceptance criteria for failure-induced migration, and so may need to be re-launched at rack 120A after repairs/replacements to resolve the failure have been completed. The switch fault may eventually be repaired (or the switch may be replaced), so that rack 120A is again available for hosting CIs. Since CI 150B was re-launched at a different rack 120B, the recovery manager or some other administrative component of the provider network may need to ensure that CI 150B is not also re-launched at rack 120A. In contrast, the recovery manager may legitimately re-launch CI 150A at rack 120A. Accordingly, in at least some embodiments, before attempting any re-launches at a rack after certain categories of failures have been fixed, a database of instance state information may have to be checked to ensure that any given CI is not re-launched multiple times.

Recovery Manager Components

Figure 2:
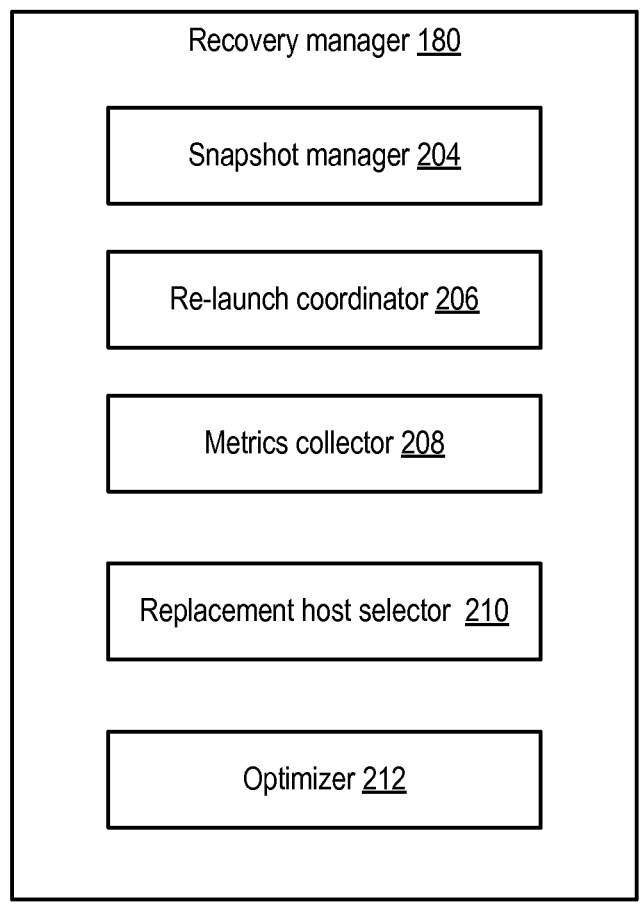
FIG. 2 illustrates example components of a recovery manager configured to implement instance migration in response to correlated failures, according to at least some embodiments.

FIG. 2 illustrates example components of a recovery manager 180 configured to implement instance migration in response to correlated failures, according to at least some embodiments. As shown, the recovery manager may comprise a snapshot manager 204, a re-launch coordinator 206, a metrics collector 208, a replacement host selector 210, and an optimizer 212 in the depicted embodiment. In other embodiments the recovery manager may comprises additional components, or some of the components shown in FIG. 2 may not be implemented.

The snapshot manager 204 may be configured to schedule, initiate, invalidate and/or discard instance state snapshots for various compute instances 150 for which migration is to be considered as an option in response to failures. The snapshot manager may be responsible in some embodiments for determining, for a given instance, whether it is a suitable candidate for generating state snapshots, and if so, what the contents of the snapshot should be, and where the snapshots should be stored. For example, the specific set of files and/or other objects that are to be included in a snapshot for a given CI 150 may be identified by the snapshot manager, as well as the storage locations (e.g., within a dedicated snapshot repository 184) at which the snapshots are to be placed. The type or mode of snapshots to be collected may also be determined by the snapshot manager—e.g., whether full snapshots comprising the entire state information sources identified for the CI are to be created each time, or whether an incremental approach is to be used in which only the subset of state information that has changed since the previous snapshot was taken is saved at least for some of the snapshots. In some embodiments, the snapshot manager may modify the intervals between successive snapshots based on various criteria as described below and illustrated in FIG. 8. In at least some embodiments, a storage service 188 may support snapshot creation operations, e.g., for scheduled backups and/or other purposes, and the snapshot manager 204 may be able to take advantage of such functionality.

In the depicted embodiment, the re-launch coordinator 206 may be configured to initiate the necessary configuration changes at the target instance host, to verify that the configuration has been completed successfully, and to issue the commands to re-launch the CI. The configuration changes may, for example, involve copying a portion or all of a snapshot to an instance host memory and/or to a local storage device at the instance host, issuing various requests to components of the virtualization software management stack at the target instance host, and the like. In at least one embodiment, the re-launch coordinator 206 may also be responsible for preventing duplicate re-launches of a given instance, e.g., by generating entries for an instance metadata database containing information about the instances that have been successfully migrated subsequent to a failure event. The metadata database itself may be maintained in some implementations at the recovery manager 180, and in other implementations at some other administrative component of the provider network.

A number of different types of metrics that may be useful in recovery-related operations may be collected in different embodiments. For example, metrics collector 208 may keep track of the time taken to re-launch various CIs, the amount of state information that is written and read, the amount of network traffic involved in recovery, and so on. Such metrics may be used, e.g., by components such as optimizer 212, to modify some of the recovery technique parameters, such as the types or locations of the target instance hosts that are selected, the frequency at which snapshots are generated, and so on. In some embodiments, the recovery manager 180 may provide feedback to other components of the provider network, such as to placement service 186, based on the collected metrics. For example, analysis of the metrics may indicate that in order to recover all the instances from a given rack more quickly, it may make sense to configure no more than K CIs that have a large amount of state information stored locally at any given rack—e.g., if less than K such instances are hosted on a rack, the recovery for the whole rack can be implemented in less than T1 seconds on average, while if more than K such instances are hosted, average recovery time increases to T2. The results of such analysis may influence the future decisions made by the placement service in some embodiments.

The replacement host selector 210 may be configured in some embodiments to identify specific target instance hosts for re-launching an instance, e.g., if a placement service provides a set of alternative instance hosts with available slots, or if no placement service is implemented. In at least some embodiments, the replacement host selector may be responsible for distributing the instances from one rack R1 (at which a correlated failure event was detected) among a plurality of other racks R2, R3, . . . , e.g., to reduce the probability of the set of instances again failing in a correlated fashion. The replacement host selector may modify the instance-to-host mappings and the host-to-rack mappings for a given set of migrated instances in some embodiments.

In at least some embodiments, the functionality of one or more of the resource manager components shown in FIG. 2 may be implemented largely or wholly by other network-accessible services implemented within the provider network. For example, a snapshot mechanism for block-level storage devices such as volumes may be implemented by a storage service of the provider network, and the snapshot functionality of such a service may be utilized by the recovery manager 180 in one embodiment. Similarly, metrics of various types may be collected by components of a health monitoring service 182 (shown in FIG. 1), and the resource manager 180 may utilize some of the capabilities of such a health monitoring service instead of implementing an independent set of metrics collectors in some embodiments. Some of the capabilities of a placement service 186 may be used by the recovery manager 180 in one embodiment. In at least some embodiments, a component of the resource manager 180 shown in FIG. 2 may issue programmatic requests in the form of API (application programming interface) calls to other services of the provider network, such as a storage service, health monitoring service or placement service, to implement at least part of the component's functionality.

Rack Components

Figure 3:
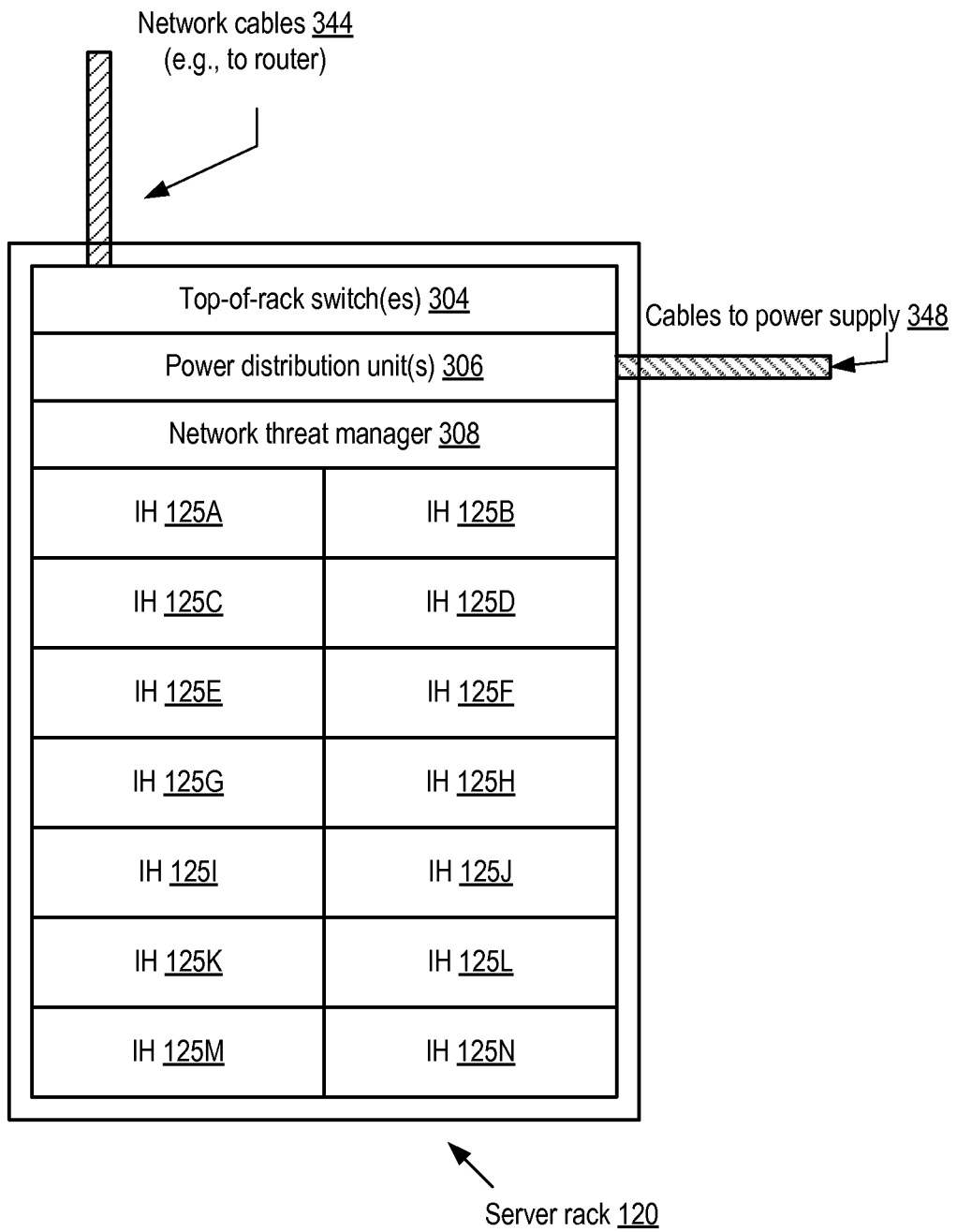
FIG. 3 illustrates example components of a server rack that may be used at a provider network, according to at least some embodiments.

FIG. 3 illustrates example components of a server rack 120 that may be used at a provider network, according to at least some embodiments. As rack 120 may comprise several instance hosts 125, such as instance hosts 125A-125N, that may share some resources related to networking, security, power and the like. For example, one or more shared "top-of-rack" network switches 304 may enable connectivity to the internal network of the provider network (as well as external networks) via a set of network cables 344. A power distribution unit (PDU) 306, or multiple such units, may enable electrical power to be obtained for the various rack-mounted components, such as the instance hosts 125, the networking devices, and so on, via some set of power cables 348 to a power supply source. In addition, in at least some embodiments, a network threat manager 308 may be configured to, for example, analyze traffic patterns and network events for the various devices of the rack, so that network intrusions, denial-of-service attacks and the like can be identified.

Hardware, software, and/or firmware failures at one or more of the illustrated rack components may affect the functionality of the compute instances implemented at the rack. For example, if the top-of-rack switch 304 fails or the networking cables 344 are damaged or disconnected, all the instances running at the instance hosts may become unavailable. Similarly, if the PDU or PDUs fail or their power cables 348 are damaged or unconnected, some number of instance hosts may lose power and the execution of the corresponding instances may be terminated prematurely. In at least some embodiments, depending for example on the security policies being implemented at the virtual computing service, a failure of a security component such as network threat manager 308 may also render the instances unusable—e.g., in accordance with the security policy, it may not be advisable or possible to continue running the instances even though the physical resources to continue the instances remain available, and failure-induced migration of the instances may have to be considered.

As mentioned earlier, in some embodiments a health monitoring service 182 (or some component of a recovery manager 180) may be responsible for tracking the state and/or responsiveness of various compute instances or other service instances in the provider network. The monitoring entities may themselves be distributed, such that not all the compute instances implemented at a given rack may be monitored by the same entity in some embodiments. Accordingly, it may take some correlation analysis, in which the rack locations of unresponsive compute instances are taken into account, before a rack-level failure such as a failure at a top-of-rack switch, a PDU, shared cables and the like is recognized. In some embodiments, information regarding the rack location of the various instance hosts and the mappings between the instance hosts and the compute instances may be managed by a different service than the health monitoring service, so data may have to be collected from a plurality of sources (e.g., by the recovery manager 180) before rack-level failures can be identified.

Instance Host Overview

Figure 4:
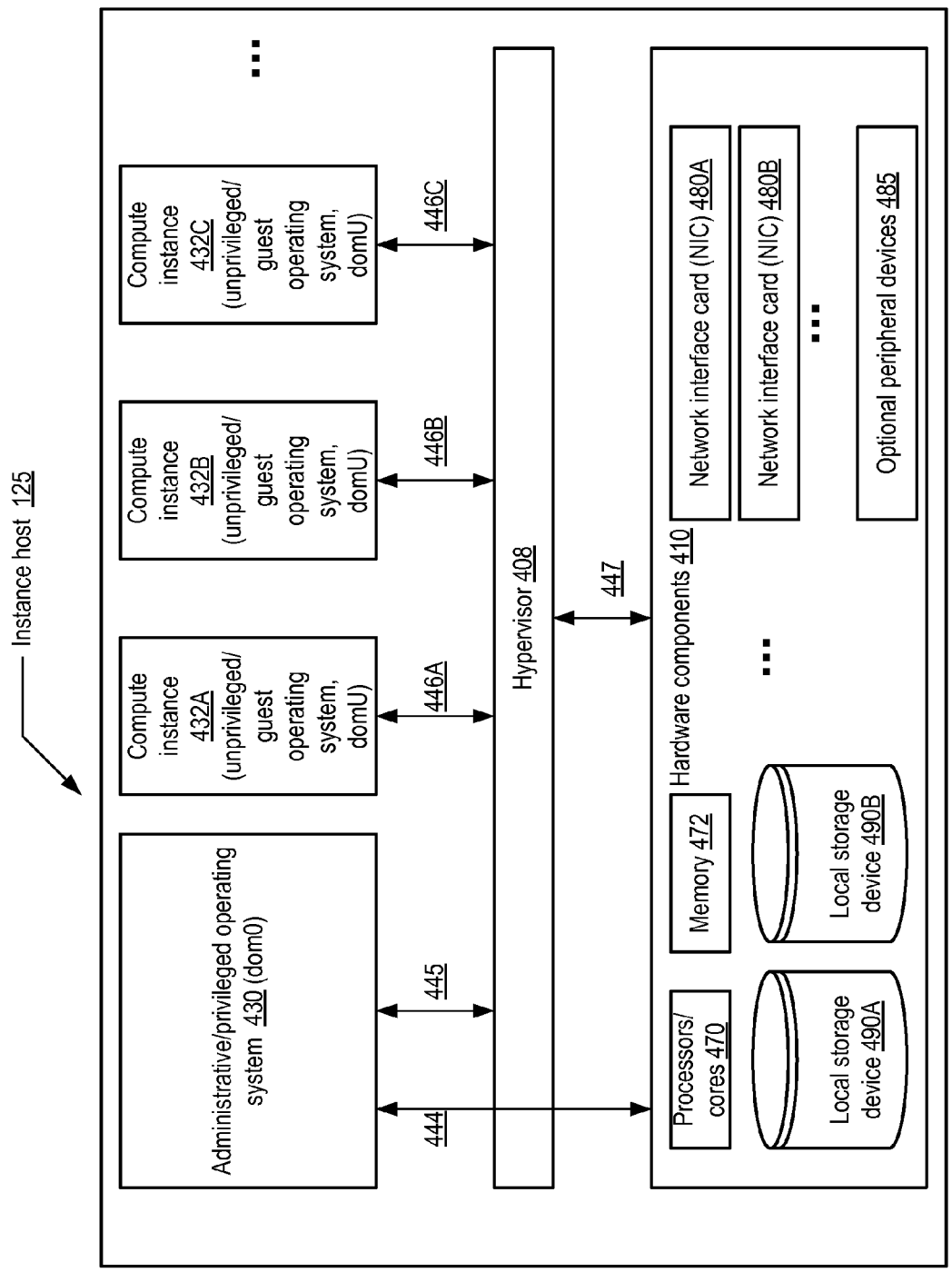
FIG. 4 illustrates an example architectural overview of an instance host that may be used at a virtual computing service, according to at least some embodiments.

FIG. 4 illustrates an example architectural overview of an instance host 125 that may be used at a virtual computing service, according to at least some embodiments. As shown, the instance host 125 may comprise a plurality of hardware components 410, which may include, for example, some number of processing cores or processors 470, a main memory 472 typically comprised of various modules of volatile memory, one or more local storage devices 490 such as disks 490A and 490B (which may include rotating disks and/or solid state disks), and one or more network interface cards (NICs) 480 such as 480A and 480B. In some embodiments, optional peripheral devices 485 may also be attached to the instance host, such as one or more monitors, mice, and the like.

The hardware resources of the instance host 125 may be virtualized (e.g., presented to several virtual machines or compute instances 432 booted or launched at the instance host as though each of the instances had exclusive access to the hardware) using a virtualization management software stack that comprises a hypervisor 408 and/or an administrative instance of an operating system 430 in the depicted embodiment. The administrative instance of the operating system may be referred to as a "privileged domain" labeled "domain 0" or "dom0" in some implementations, while respective operating systems established for each of the compute instances 432 may be referred to as "unprivileged domains" (labeled "domU"), "guest operating systems", or "guest domains". When a hardware component is to be utilized by a compute instance 432, e.g., due to an operation requested by the operating system or by an application running on top of the operating system, the hypervisor 408 may act as an intermediary between the instance and the hardware component, as indicated by the arrows 446A, 446B, 446C and 447 in the depicted embodiment. In some cases, depending for example on the programmatic interfaces being used, both the hypervisor and the administrative operating system instance 430 may be intermediaries between the instance and the hardware. For example, the request path for an operation may flow as follows: domU→hypervisor→dom0→hypervisor→hardware, and the response may be provided to the instance using the reverse path. In some implementations, dom0 may be able to directly access one or more types of hardware components (as indicated by arrow 444); other interactions between dom0 and the hardware may pass through the hypervisor (as indicated by arrow 445).

As a result of the intermediary roles played by the hypervisor 408 and/or the administrative operating system 430 with respect to various types of requests generated at the compute instances, it may be possible for one or both of these virtualization management software stack components to intercept write requests originating at the compute instances 432 and directed to local storage devices 490 in at least some embodiments. In various embodiments, either or both virtualization components may also be able to distinguish write requests comprising state information relevant to re-launches from write requests that would not affect re-launches (e.g., on the basis of the paths/locations of files or objects being written to, or based on the identity of the instance components that issue the write requests). In one embodiment the hypervisor 408 may maintain local metadata regarding instance state snapshots of a given compute instance 432, including such information as when the last snapshot was completed, whether the most recent snapshot taken is currently valid or has been invalidated, and so on. In other embodiments, the administrative operating system instance may maintain such metadata.

When a write request that may alter instance state information associated with a re-launch of the instance is directed to a local storage device 490, in at least some embodiments the request may be intercepted or delayed at the hypervisor or at dom0. Before the contents of the write are made persistent at the local storage device 490, a notification may be sent (e.g., to snapshot manager 204) to invalidate one or more earlier-generated snapshots of the instance's state information, since the snapshot's contents would be rendered out-of-date by the write. The notification may be sent by either component of the virtualization software stack in different embodiments. After the notification has been sent and a corresponding acknowledgement has been received, the write may be allowed to proceed. Local metadata corresponding to the snapshot(s) of the instance may be modified to indicate the invalidation in some embodiments. Later, when the snapshot manager generates a fresh snapshot, the local metadata at the virtualization management software stack may be updated to indicate that the current snapshot is valid. The local metadata may be used in some embodiments to decide whether a write should be allowed to proceed without delay, e.g., if the latest snapshot corresponding to the write-issuing instance is already known to be invalid. In some embodiments, snapshot metadata may not be maintained at the virtualization management software stack, and in at least some such embodiments any write that may alter the instance state information maintained at a local storage device 490 may be delayed until an acknowledgement of the invalidation (or a confirmation of invalidation) of the snapshot of the instance is received.

Corresponding to each compute instance's operating system, a number of file systems including a root file system may be configured in various embodiments. The root file system (e.g., "/" or "/root" in various Unix-based or Linux-based operating systems) may comprise a number of data objects that may be needed for launching (or re-launching) the instance, such as various configuration files, permission metadata, and the like. In some provider networks, several different modes of root file system configuration may be supported for compute instances by virtual computing service. For example, in one embodiment, a provider network may implement a storage service that provides virtualized block-level storage devices or volumes that can be attached over the network from a compute instance (e.g., using network interface cards 480 and/or virtual network interfaces). At least a portion of the root file system for the compute instance may be instantiated on a network-attached volume in such an embodiment, and as a result in at least some cases local storage devices 490 may not be required for the root file system. Such instances may be referred to as "block-storage-service-backed" compute instances, as the physical storage being used for their critical metadata is implemented remotely (or "backed") at a storage service that presents block-level programmatic interfaces. If a given block-storage-service backed compute instance does not use local storage at all for state information (e.g., local storage devices 490 are used at most for temporary files and the like), the instance may meet the acceptance criteria for failure-induced migration without the need for any snapshots in at least some embodiments.

In contrast, for some compute instances, the local storage devices 490 may be used for the root file system in at least some embodiments. In such a scenario, a machine image to be used for the root file system may be copied to a local storage device 490 at the instance host where the instance is to be launched, and the contents of the root file system may be extracted to launch the instance. (For a re-launch, the machine image may in some cases have to be merged with local changes to the root file system in some embodiments, obtained for example from snapshots created for the instance.) Compute instances employing this mode of root file system implementation may be referred to as "instance-storage-backed" instances or "local-storage-backed" instances. In some embodiments, the clients or customers on whose behalf the instances are launched may be able to select the mode of root file system implementation, and may be provided information regarding the cost/benefit tradeoffs of the two approaches by the provider network operator. For example, if the root file system contents are stored locally rather than at remote physical storage of the storage system, a failure at local storage of the instance host (or a rack-level failure at the rack at which the instance host is mounted) may result in a higher probability of loss of state information than if a block-storage-backed approach were used. In at least some embodiments, state information required for re-launching may be stored on local storage devices 490 regardless of the manner in which the root file system is implemented—e.g., some state information may be stored by applications or the guest operating system using "ephemeral" files or file systems on local storage devices even if the bulk or all of the contents of the root file system are stored at a network-accessible remote storage device.

Instance State Information

Figure 5:
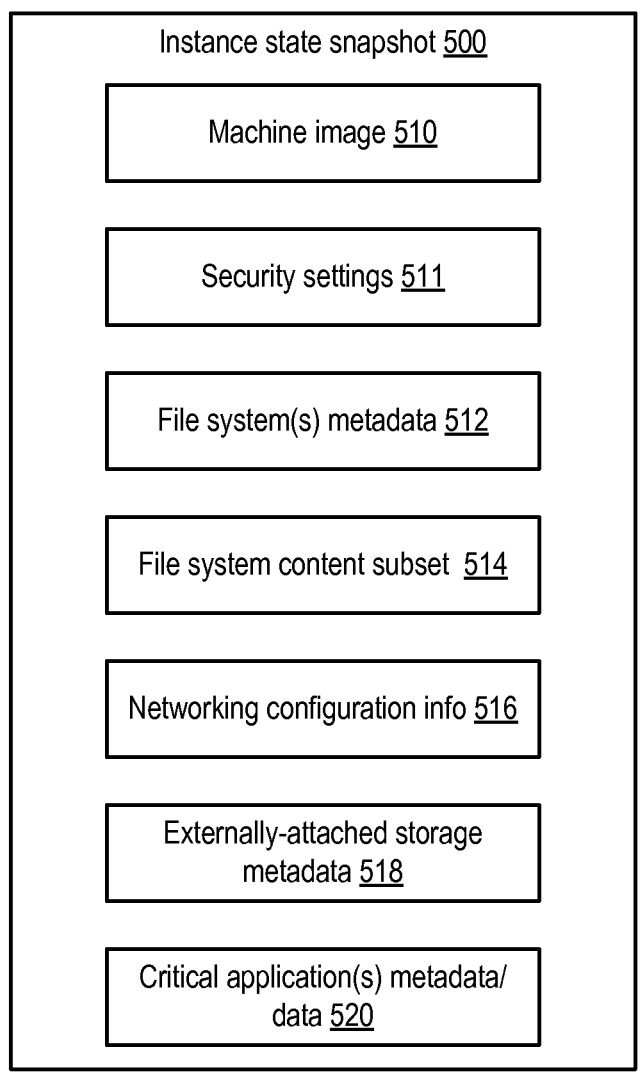
FIG. 5 illustrates examples elements of state information that may be included in snapshots created for compute instances, according to at least some embodiments.

FIG. 5 illustrates examples elements of state information that may be included in snapshots created for compute instances, according to at least some embodiments. As shown, an instance state snapshot 500 may comprises a machine image 510, security settings 511, file system metadata 512, file system content subset 514, networking configuration information 516, metadata 518 on externally-attached storage, and/or critical applications metadata or data 520 in the depicted embodiment. In at least some embodiments, provider networks may enable a client to select a machine image 510, e.g., from among a plurality of supported machine image types, to be used as the template from which a compute instance can be launched. Respective machine images may be provided, for example, for different operating systems or versions of operating systems supported at the provider network, and for different instance "sizes" or capability levels, such as "small", "medium" or "large" instances. A machine image may include the necessary software packages for the compute instance's root file system to be configured, and the modules necessary to integrate the compute instance with various other services implemented in the provider network. In at least some embodiments, in order to fully re-build the execution environment of a compute instance at a new target instance host after a failure, the machine image used for the instance's initial launch may need to be merged with changes made after the instance was launched. Accordingly, when creating a snapshot 500 of state information required for re-launch, the machine image may be included in such embodiments.

Security settings 511 may, for example, govern which user and/or group accounts are granted permission to start/stop the compute instance, modify various aspects of the configuration of the compute instance, and/or access various metadata and data objects. Metadata 512 pertaining to one or more file systems established at the operating system of the compute instance, such as for example the sizes, mount points and other attributes of the file systems may be included in snapshot 500 in at least some embodiments. Contents 514 of at least a subset of the files in one or more file systems may also be saved in snapshots in some embodiments. Networking configuration information 516 included in a snapshot may comprise, for example, the settings for various virtual network devices and/or interfaces, IP (Internet Protocol) addresses or aliases, subnet configuration settings, and so on. In some cases, the compute instance may be attached programmatically to external storage devices, such as virtual volumes implemented by a network-accessible storage service providing a block-level interface, and metadata 518 pertaining to such programmatic attachments may be required to re-attach the external device subsequent to re-launch. In at least some implementations, such devices may be used for the instance's root file system as described earlier. In one embodiment, application metadata and/or data 520 for some set of applications designated as critical by a client on whose behalf the instance is run may be included in snapshot 500. In such an embodiment, a programmatic interface may be provided to enable the client to indicate which set of files and/or logical devices are to be included in the application-related subset of the snapshot. In various embodiments, the virtualization software management stack and/or the recovery manager 180 may determine the set of information that should be included in the snapshots generated for various compute instances, e.g., based on the instance type and/or on the specific configuration of the instance hosts at which the compute instances run. It is noted that not all the elements of state information illustrated in FIG. 5 may be included in snapshots in some embodiments, and that additional elements not shown in FIG. 5 may be saved in snapshots in other embodiments.

Methods for Rapid Recovery Using Instance Migration

Figure 6:
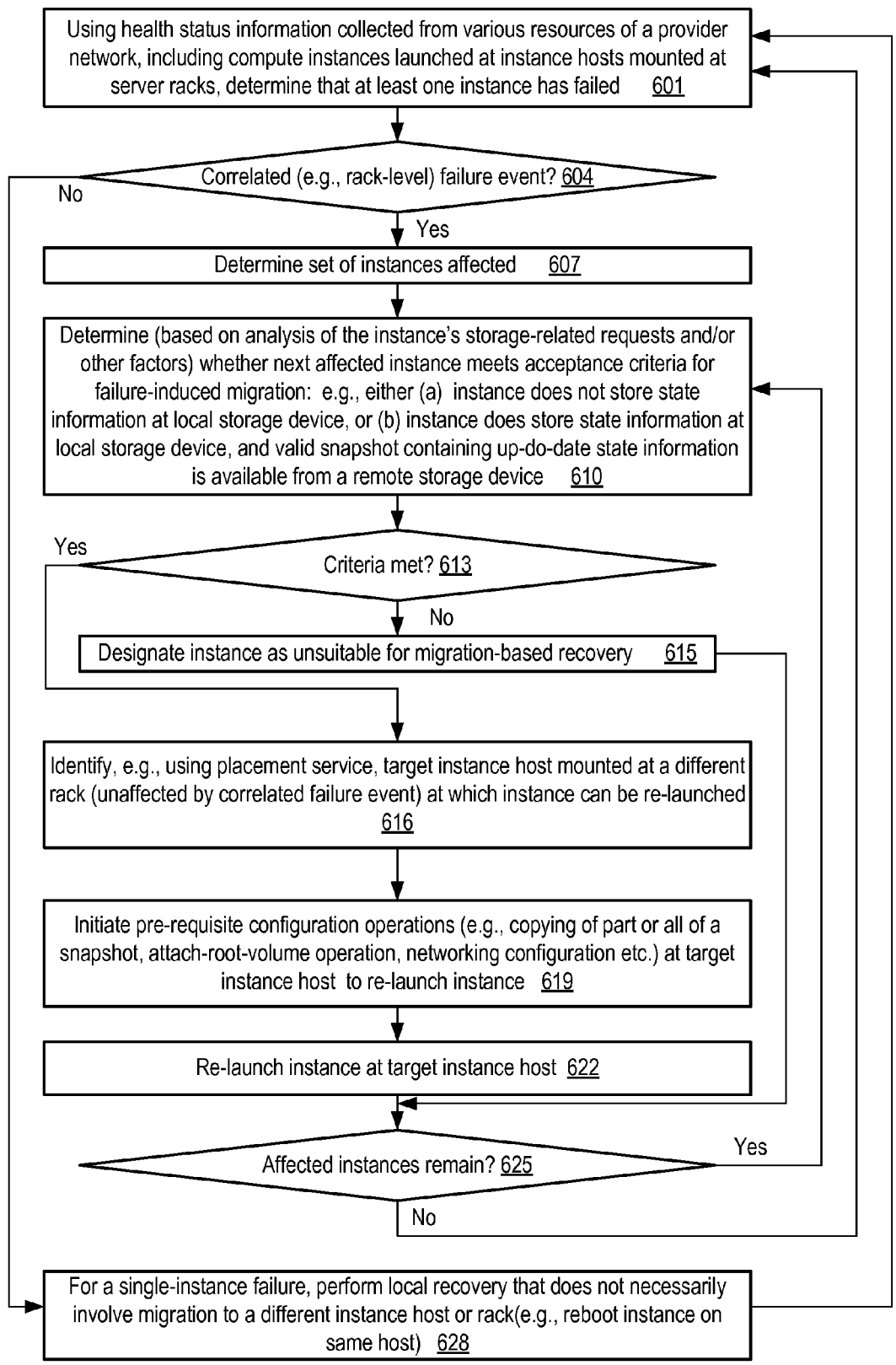
FIG. 6 is a flow diagram illustrating aspects of operations that may be performed to respond to one or more types of failure events using instance migration, according to at least some embodiments.

FIG. 6 is a flow diagram illustrating aspects of operations that may be performed to respond to one or more types of failure events (including for example correlated or rack-level failure events) using instance migration, according to at least some embodiments. Health status information may be collected from various components of a provider network, including compute instances implemented at instance hosts mounted on various racks at provider network data centers. As shown in element 601, the health status information may be used to determine that at least one compute instance has failed or become unresponsive. In some embodiments, a dedicated health monitoring service that comprises hardware and/or software monitoring agents distributed at various locations in the data centers may be used. In one embodiment, a heartbeat based mechanism may be used to monitor CI health, in which the responsiveness (or lack of responsiveness) of an instance to a sequence of network messages may be used to determine whether the instance is in a healthy state or in an unhealthy state. For example, in one implementation if a given compute instance does not respond within a threshold time period to N successive heartbeat messages, the instance may be designated as having failed. Any of various factors may have led to the unresponsiveness of the instance, some of which may involve software or hardware faults at the rack, the instance host, the instance itself, or along the network path between the monitoring entity and the compute instance. Thus, for example, in one embodiment an instance may be considered "failed" from the perspective of the recovery manager and/or other parts of the provider network control plane if a networking component along the path to the instance fails, even though the execution of the instance on the compute instance may not have been terminated Based on an analysis of the health state information, and/or on instance placement or location information that may be obtained from other control-plane components of the provider network, a determination may be made as to whether the instance failure is part of a correlated failure event in which multiple instances at a rack are affected, or a single-instance failure unrelated to other instances. If the probability that a correlated failure, such as one caused by a fault at a rack switch or a PDU, is estimated to be high (as determined in operations corresponding to element 604), in the depicted embodiment a set of failure-induced migration operations may be considered for the set of instances affected, starting with operations corresponding to element 607. In contrast, if the probability that the failure is not correlated with other instance on the same rack is estimated to be high, local recovery operations may be performed (element 628) in the depicted embodiment, in which, for example, the instance may be restarted without migrating it to a different rack. It is noted that in at least one embodiment, at least some non-correlated failures (e.g., failures of a single instance within a single instance host or rack) may also be addressed using migration.

In the case of a correlated failure caused by a fault at some shared rack component, it may take on the order of an hour or more to diagnose the root cause and resolve the problem in some data centers, especially if support personnel have to be found and dispatched to the rack. Accordingly, a recovery manager may attempt to migrate at least some of the instances that were running at the rack to a different rack in the depicted embodiment. A list of the affected or failed instances may be determined (element 607), and each of the affected instances may be examined as possible candidates for migration and re-launch. The recovery manager may determine whether the next instance being considered meets acceptance criteria for failure-induced migration (element 610). In some embodiments, the criteria may be based at least in part on an analysis of the storage-related requests or accesses of the instance, such as the storage devices to which various types of write requests are directed from the instance. (Other factors, such as the service level agreements in place for the instance, or the identity of the client on whose behalf the instance was launched, may be used instead in at least some embodiments.) As part of the evaluation, for example, the recovery manager may determine whether state information of the compute instance is stored to local storage devices at the instance host. Such a determination may be based various factors in different embodiments, including for example on the manner in which the instance's root file system was configured (e.g., whether the instance's root file system was implemented using a virtual device backed by a remote storage of a storage service, or the root file system was stored on local storage devices), information collected prior to the failure by the virtualization management stack based on analysis of the destinations to which write operations from the instance were directed, and so on. If none of the state information required to re-launch the instance was written to local storage at the instance host, the instance may meet the acceptance criteria in some embodiments. Alternately, if the instance did write state information to local storage at the instance host, and a valid snapshot comprising up-to-date state information of the instance is available at a storage location unaffected by the failure, such an instance may also meet the acceptance criteria in some embodiments.

If the acceptance criteria are met (as determined in element 613), a target instance host at a different rack may be selected as the destination at which the instance should be re-launched (element 616) in the depicted embodiment. In at least some embodiments, a placement service of the provider network, responsible for identifying available instance slots (e.g., sufficient computing, storage, memory and networking capacity to meet the needs of an instance) may be used by the recovery manager to find an appropriate target instance host. A set of pre-requisite configuration operations that may be needed prior to re-launch may then be initiated, e.g., by the recovery manager in coordination with the virtualization management software stack components at the selected target instance host (element 619). Any combination of several different types of configuration operations may be required in different implementations, such as copying portions or all of a snapshot to the target instance host, attaching a root volume, modifying networking configuration, merging machine image contents with subsequent state change records, and so on. The compute instance may then be launched at the target instance host (element 622). If the instance being considered does not meet the acceptance criteria (as also detected in element 613), it may be designated as unsuitable for migration, and its restart may have to await the resolution of the failure event (element 615). If one or more instances from the list of instances affected by the failure remain (as detected in element 625), the next instance may be examined for possible failure-induced migration (e.g., by repeating operations for that instance corresponding to elements 610 onwards). As discussed earlier, the mappings that existed between instances and hosts (and between instances and racks) prior to the failure may change as a result of the migration in at least some cases in various embodiments—e.g., a different number of target instance hosts may be used than the number of hosts being used for the instances prior ti the failure, and the target hosts may be distributed in a different way among racks.

Figure 7:
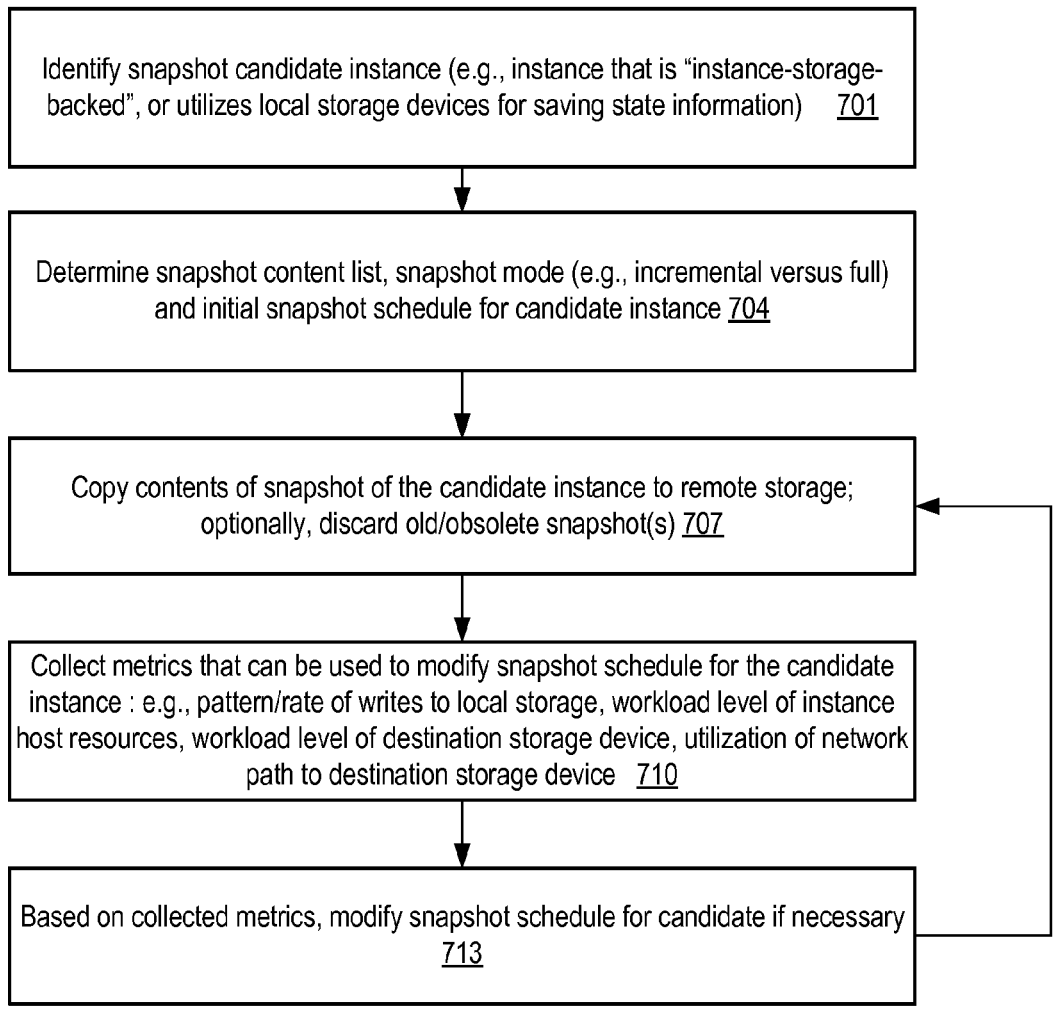
FIG. 7 is a flow diagram illustrating aspects of operations that may be performed for instance state snapshot management, according to at least some embodiments.

FIG. 7 is a flow diagram illustrating aspects of operations that may be performed for instance state snapshot management, according to at least some embodiments. Snapshots of instance state information may not be generated for all compute instances in some embodiments. Instead, some subset of instances may be selected for snapshots based on various factors. As shown in element 701, a candidate instance for generating snapshots may be identified in some embodiments if it is "instance-storage-backed" (i.e., if its root file system is implemented at a local storage device at its instance host instead of using remote network-accessible storage devices), or if writes of state information have been directed from the instance to local storage devices (as detected, for example, by components of the virtualization management software stack such as the hypervisor or an administrative operating system). Other factors, such as input from the clients on whose behalf the instances are run, or an analysis of the relative importance of some instances versus others, may be used to help decide whether a series of snapshots should be generated for some particular instance in other embodiments. The time at which a compute instance is identified as one for which a snapshot series should be created, relative to the initial launch of the instance, may differ in different implementations. For example, in one implementation the decision as to whether snapshots are to be created may be made prior to, or at, the time of the initial launch, while in other implementations the write requests issued by the instance after the launch may be analyzed to make the snapshot decision after the initial launch.

For those instances for which a decision to generate snapshots is made, the contents of the snapshot may be determined (element 704), an initial snapshot schedule may be determined (e.g., a snapshot is to be generated once every X seconds or minutes), and the snapshot mode may be selected (e.g., how often full snapshots versus incremental snapshots are to be created, or whether inly full snapshots are to be created). In accordance with the schedule in effect, the contents of the snapshot may be copied over a network path from the local storage devices at the instance host of the compute instance to a remote storage device (element 707). In subsequent iterations of snapshot generation, in at least some embodiments older snapshots may be invalidated or discarded when a new one is stored for the same compute instance.

The initial snapshot schedule may in some cases indicate that a snapshot should be generated for a given instance at regular intervals. In some embodiments, the intervals between successive snapshots may be dynamically modified over time based on a variety of factors or metrics. For example, as indicated in element 710, some combination of metrics pertaining to the pattern or rate of writes directed to state information of the instance, the workload levels at the target instance host and/or the storage devices at which the snapshots are to be stored, or the utilization levels of the network paths used for the snapshots may be collected and analyzed to determine whether the snapshot schedule for a given instance should be changed. If the analysis indicates that some resource involved in the snapshot creation pathway is busier than normal, for example, or if no writes directed to state information have occurred since a previous snapshot, the interval to the next snapshot may be extended. In contrast, in some cases the next scheduled snapshot may be preponed, if for example a substantial amount of state information locally-stored at the instance host has been generated and the resources involved in snapshot generation are not too heavily utilized. The schedule for the snapshots may accordingly be changed as needed (element 713), and the next snapshot may be captured based on the modified schedule. The process of snapshot generation for an instance, metrics collection and snapshot schedule adjustment (i.e., operations corresponding to elements 707, 710 and 713) may be repeated in some cases, e.g., until the instance is terminated.

Figure 8:
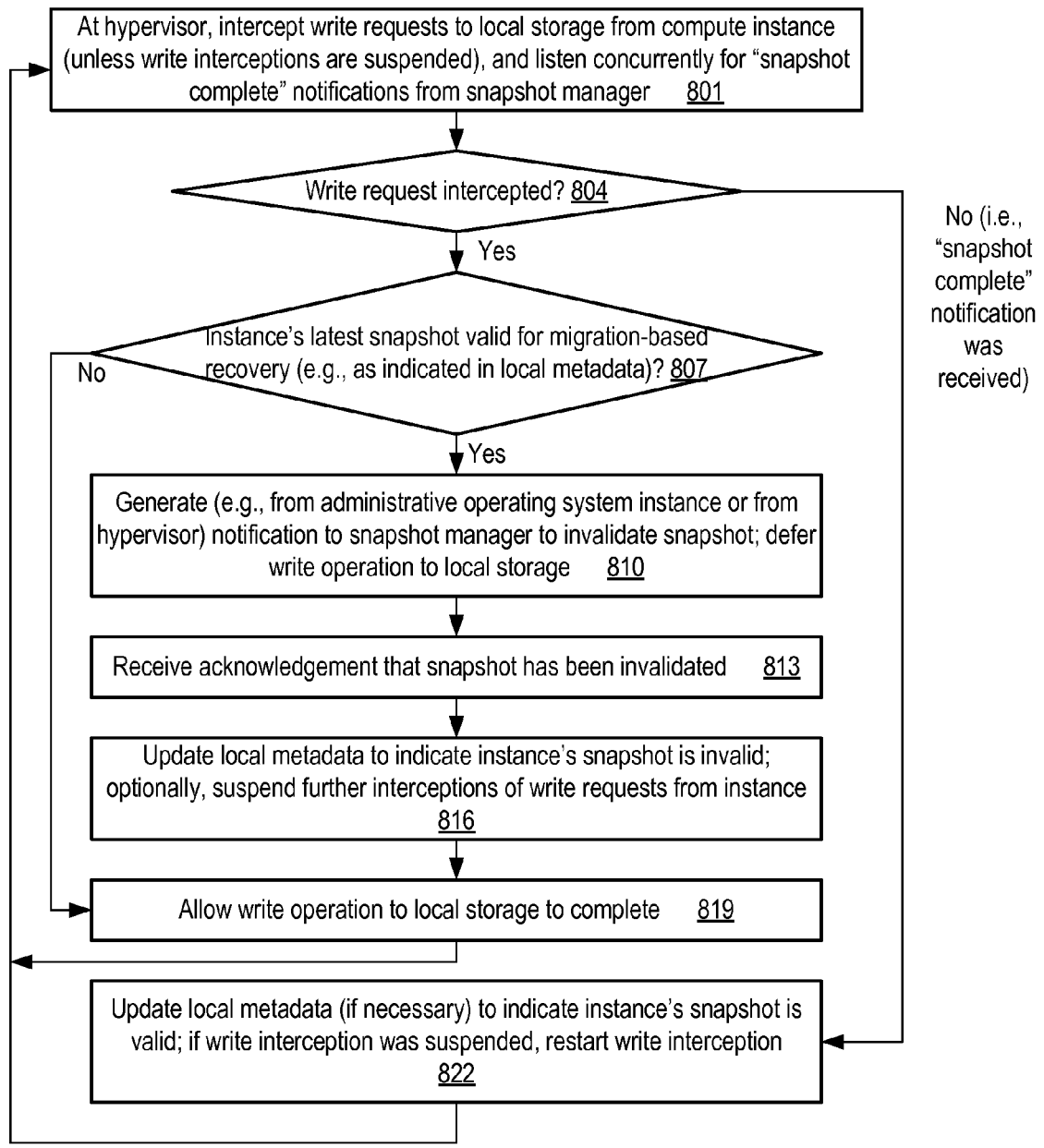
FIG. 8 is a flow diagram illustrating aspects of operations that may be performed at an instance host to schedule write operations requested from compute instances, according to at least some embodiments.

As mentioned earlier, in some embodiments at least some write operation that modify state information at local storage devices of an instance host may be intercepted and/or delayed at the virtualization management software stack, e.g., to ensure that the state of re-launched instances that rely on snapshot contents is not rendered inconsistent as a result of using an out-of-date snapshot. FIG. 8 is a flow diagram illustrating aspects of operations that may be performed at an instance host to schedule write operations requested from compute instances, according to at least some embodiments. As shown in element 801, in the depicted embodiment at least two types of operations related to snapshot-based instance recovery may be scheduled at a hypervisor. One type of operation may involve intercepting write requests directed to data objects that comprise instance state information stored on local storage devices of the instance host (unless interception is suspended based on the logic described below). The second type of operation may involve listening for notifications (generated for example by a snapshot manager) that a new snapshot corresponding to a compute instance of the instance host has been completed or made persistent at a remote storage device; such notifications may be termed "snapshot complete" notifications. The writes may be intercepted in order to invalidate existing (earlier-generated) snapshots if necessary; while the "snapshot complete" notifications may be used to determine whether a valid snapshot exists that should be invalidated if it is updated. The two types of operations may be asynchronous with respect to each other, and both may involve waiting for triggering events (e.g., a write request or a notification).

If the next triggering event is an interception of a write request (as detected in element 804), a determination may be made as to whether the snapshot whose source contents may be modified by the write (i.e., the data objects from which the snapshot was copied) is currently valid (usable for re-launch purposes). In some embodiments, local metadata pertaining to snapshots for one or more instances may be maintained at the virtualization management software stack at the instance host, e.g., indicating whether the latest known instance is valid or invalid, when the latest snapshot was completed, and so on. Such metadata may be examined in some embodiments to determine whether the most recent snapshot is in a valid state or has already been marked as invalid. If the latest snapshot is valid as of the time the write is intercepted, a notification may be transmitted (e.g., to the snapshot manager from the administrative operating system or the hypervisor at the instance host) to invalidate the snapshot (element 810). The modification corresponding to the requested write operation of the data at the local storage device may be deferred until an acknowledgement or indication is received that the snapshot has in fact been designated as obsolete.

After such an acknowledgement is received (element 813), the local snapshot metadata at the instance host (if such metadata is used) may be modified to indicate that the snapshot has been invalidated—i.e., that no valid snapshot of the compute instance is currently known to exist (element 816). In addition, in at least some embodiments, as an optimization, further write interceptions may optionally be suspended temporarily, since the snapshot is already marked as invalid and therefore cannot be used to prepare for re-launch of the instance. The current write operation (the one that led to the generation of the invalidation notification) may be allowed to complete (element 819), and the hypervisor may resume waiting for the next write or the next "snapshot complete" notification (by resuming the operations of element 801 onwards).

If a "snapshot complete" notification is received at the virtualization management software stack (as also determined in element 804), local metadata pertaining to the corresponding compute instance may be updated to reflect the fact that a new valid snapshot is now available to enable failure-induced migration of the instance (element 822). Of course, in some scenarios the local metadata may already indicate that the snapshot for the compute instance is currently valid, in which case the local metadata may not have to be updated. In embodiments in which the write interceptions were previously suspended, write interceptions may be restarted so that the snapshot that was completed may be designated as invalid if any changes that modify state information are directed to the local storage device. In some embodiments, instead of invalidating the snapshots when a write event occurs locally, the write may be replicated at the storage device where the snapshot is stored before the write is permitted to complete at the local storage device, so that the remote snapshots remain valid and usable for re-launch.

It is noted that in some embodiments, the operations illustrated in the flow diagrams of FIG. 6, 7 or 8 may be performed in a different order than that shown, or several of the illustrated operations may be performed in parallel. For example, operations corresponding to the analysis of several or all affected compute instances (e.g., to determine whether failure-induced migration should be attempted) illustrated in FIG. 6 may be performed in parallel, e.g., by a multi-threaded recovery manager. In some embodiments, some of the operations illustrated in the flow diagrams may be omitted, while other operations may be added.

Use Cases

The techniques described above, of reducing recovery times for compute instances that may be affected by rack-level failures from on the order of an hours or more using instance migration may be beneficial in many provider network environments. As the performance capabilities of commodity servers with small form factors increases, more and more compute instances may typically be hosted on an average rack, so that at least some types of rack-level failures may end up affecting fairly large numbers of instances concurrently. At the same time, the high-availability expectations of provider network clients (some of which are based on service-level agreements with the provider network operator) have increased. Hence, the option of leaving potentially large numbers of compute instances "down" for long periods has become less and less palatable. Provider networks in which the infrastructure for creating point-in-time snapshots of storage device contents (e.g., snapshot-related application programming interfaces, network-accessible storage services that support block-level device interfaces and the like) is well-tested and efficient may be able to implement the recovery optimization techniques for a wide variety of compute instances.

Illustrative Computer System

Figure 9:
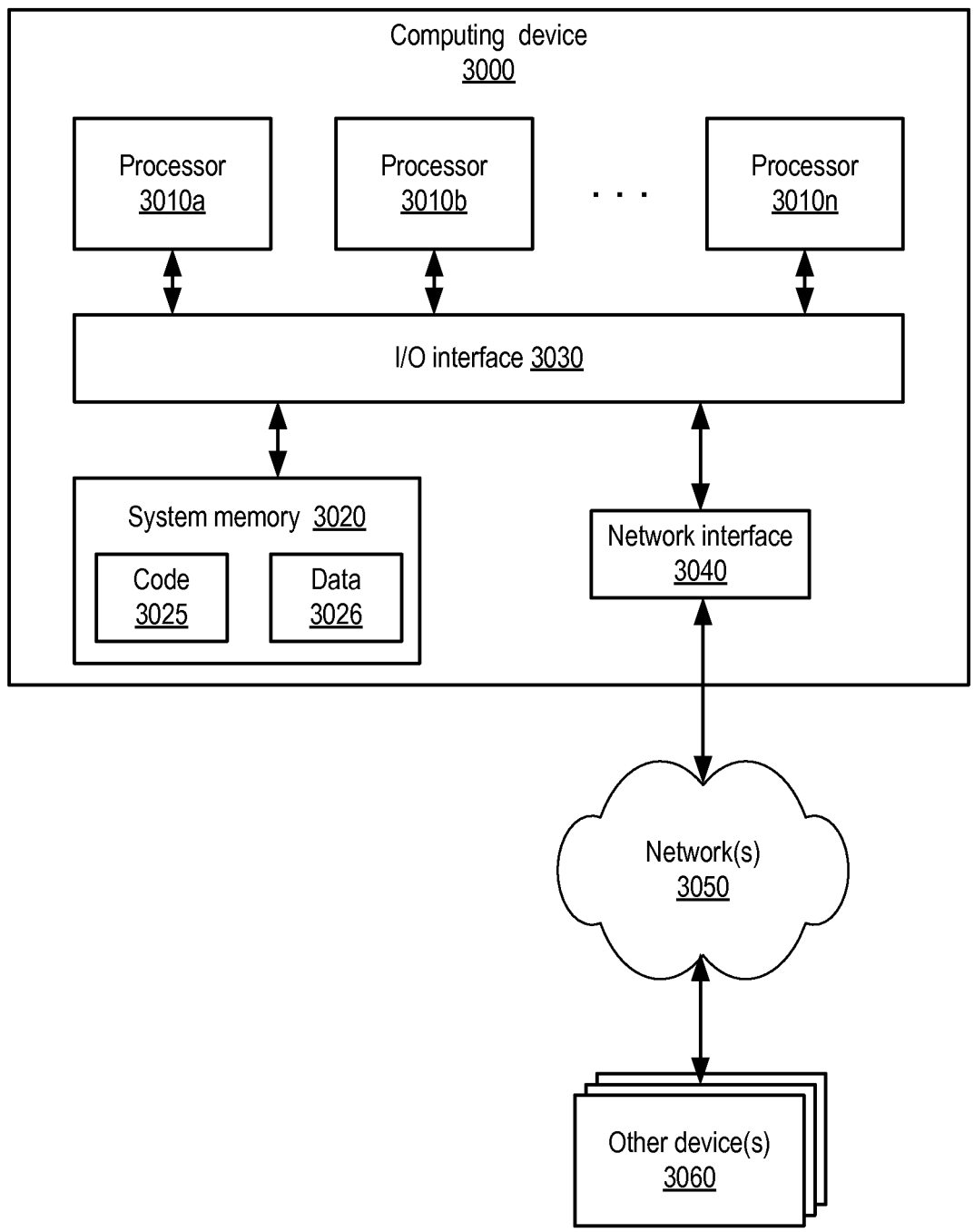
FIG. 9 is a block diagram illustrating an example computing device that may be used in at least some embodiments.

In at least some embodiments, a server that implements a portion or all of one or more of the technologies described herein, including the techniques to coordinate and implement compute instance migration and re-launch in response to failure events, may include a general-purpose computer system that includes or is configured to access one or more computer-accessible media. FIG. 9 illustrates such a general-purpose computing device 3000. In the illustrated embodiment, computing device 3000 includes one or more processors 3010 coupled to a system memory 3020 (which may comprise both non-volatile and volatile memory modules) via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA. In some implementations, graphics processing units (GPUs) may be used instead of, or in addition to, conventional processors.

System memory 3020 may be configured to store instructions and data accessible by processor(s) 3010. In at least some embodiments, the system memory 3020 may comprise both volatile and non-volatile portions; in other embodiments, only volatile memory may be used. In various embodiments, the volatile portion of system memory 3020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices used to store physical replicas of data object partitions. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 8, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices, comprising:
      one or more processors; and
      a memory comprising program instructions that when executed on the one or more processing cause the one or more computing devices to:
      monitor respective health status information of a plurality of compute instances of a virtual computing service of a provider network, wherein a subset of the compute instances are hosted at one or more instance hosts mounted at a first server rack;
      detect, based on an analysis of the health status information, that one or more rack-level failure events affecting the subset of the compute instances at the first server rack have occurred;
      in response to a determination, that the particular compute instance meets an acceptance criterion for a failure-induced migration to a different server rack:
         identify a target instance host, mounted at a second server rack of the provider network, to which the particular compute instance is to be migrated; and
         initiate one or more configuration operations to re-launch the particular compute instance at the target instance host;
      wherein the acceptance criterion is based, as least in part on:
         an analysis of storage-related operations requested from a particular compute instance of the subset prior to the one or more rack-level failure events; and
         a determination of whether state information of the particular compute instance is saved at a local storage device affected by the one or more rack-level failure events.

2. The system as recited in claim 1, wherein prior to said detection that one or more rack-level failure events have occurred, the particular compute instance is hosted at a first instance host mounted at the first server rack, wherein to determine that the particular compute instance of the subset meets the acceptance criterion, the program instructions further cause the one or more computing devices to:
   determine that state information of the particular compute instance is not saved at a local storage device attached to the first instance host.

3. The system as recited in claim 1, wherein prior to said detection that one or more rack-level failure events have occurred, the particular compute instance is hosted at a first instance host mounted at the first server rack, wherein to determine that the particular compute instance of the set meets the acceptance criterion, the program instructions further cause the one or more computing devices to:
   determine that (a) state information of the particular compute instance is saved at a local storage device of the first instance host and (b) a remote snapshot of at least a portion of contents of the local storage device comprises valid state information of the particular compute instance that was saved at the local storage device.

4. The system as recited in claim 1, wherein the program instructions further cause the one or more computing devices to:
   generate, prior to the detection of the one or more rack-level failure events, a plurality of snapshots of at least a portion of contents of one or more local storage devices attached to a first instance host mounted at the first server rack, wherein the particular compute instance is hosted at the first instance host, and wherein the portion of contents comprises state information usable to re-launch the particular compute instance at a different instance host.

5. The system as recited in claim 1, wherein prior to said detection that one or more rack-level failure events have occurred, the particular compute instance is hosted at a first instance host mounted at the first server rack, wherein the program instructions further cause the one or more computing devices to:
   receive a notification that a write request directed from the particular compute instance to a local storage device at the instance host has been intercepted by an administrative component of the first instance host; and
   designate, in response to the notification, at least one earlier-generated snapshot of at least a portion of contents of the local storage device as invalid for use with respect to a re-launch of the particular compute instance.

6. A method, comprising:
   performing, by one or more computing devices:
      detecting, based on an analysis of at least a portion of health status information collected from a plurality of resources of a provider network, that one or more failure events affecting a plurality of compute instances of the provider network have occurred, wherein the plurality of compute instances comprises a particular compute instance hosted at a first instance host;
      in response to determining that the particular compute instance meets an acceptance criterion for a failure-induced migration to a different instance host;
      identifying a target instance host to which the particular compute instance is to be migrated; and
      initiating one or more configuration operations to re-launch the particular compute instance at the target instance host;
      wherein the acceptance criterion is based at least in part on:
         an analysis of storage-related operations requested from the particular compute instance prior to the one or more rack-level failure events; and
         a determination of whether state information of the particular compute instance is saved at a local storage device affected by the one or more rack-level failure events.

7. The method as recited in claim 6, wherein said determining that the particular compute instance of the set meets the acceptance criterion comprises determining that state information of the particular compute instance is not saved at a local storage device of the first instance host.

8. The method as recited in claim 6, wherein said determining that the particular compute instance of the set meets the acceptance criterion comprises:
   determining that (a) state information of the particular compute instance is saved at a local storage device of the first instance host and (b) a remote snapshot of at least a portion of contents of the local storage device comprises valid state information of the particular compute instance that was saved at the local storage device.

9. The method as recited in claim 8, further comprising performing, by the one or more computing devices:
   intercepting a write request from the particular compute instance prior to a corresponding modification of contents of the local storage device;
   generating, in response to said intercepting, a notification indicative of the write request to an administrative component of the provider network; and
   designating, by the administrative component, in response to the notification, at least one earlier-generated snapshot as invalid for use with respect to a re-launch of the particular compute instance.

10. The method as recited in claim 9, wherein the particular compute instance comprises a guest operating system instance running at the first instance host, and wherein said intercepting is performed at one of: (a) a component of a hypervisor running at the first instance host or (b) a component of an administrative operating system instance running at the first instance host.

11. The method as recited in claim 9, wherein the particular compute instance comprises a guest operating system instance running at the first instance host, wherein said generating the notification is performed by a component of an administrative operating system instance running at the first instance host in response to a request received from a hypervisor running at the first instance host.

12. The method as recited in claim 6, further comprising performing, by the one or more computing devices:
   generating, prior to said detecting, a plurality of snapshots of at least a portion of contents of one or more local storage devices attached to the first instance host, wherein the portion of contents comprises state information usable to re-launch the particular compute instance at a different instance host.

13. The method as recited in claim 12, wherein the portion of contents comprises one or more of: (a) a machine image used to boot the particular compute instance, (b) a portion of a root file system configured for the compute instance, (c) metadata associated with one or more network-attached devices of the particular compute instance, (d) networking configuration information of the particular compute instance, or (e) metadata associated with one or more applications executed at the particular compute instance.

14. The method as recited in claim 12, further comprising performing, by the one or more computing devices:
   determining a time interval between initiating a generation of a particular snapshot of the plurality of snapshots, and a subsequent snapshot of the plurality of snapshots, based at least in part on an analysis of one or more of: (a) detected patterns of write I/O (input/output) requests of the particular compute instance (b) a workload level indicator of the first instance host (c) a utilization metric of one or more network paths to a remote storage device at which the subsequent snapshot is to be stored, or (d) workload metrics of the remote storage device at which the subsequent snapshot is to be stored.

15. The method as recited in claim 6, wherein the first instance host is mounted at a particular server rack, wherein the one or more failure events comprise one or more of: (a) a loss of network connectivity to one or more control components hosted at the particular server rack, (b) a failure at an electric power distribution component of the particular server rack, or (c) a hardware failure at a particular instance host mounted at the particular server rack.

16. A non-transitory computer-accessible storage medium storing program instructions that when executed on one or more processors:
- detect, based on an analysis of at least a portion of health status information collected from one or more resources of a provider network, that a failure event affecting one or more compute instances including a particular compute instance hosted at a first instance host of the provider network have occurred;
- determine whether the particular compute instance meets an acceptance criterion for a failure-induced migration, wherein the acceptance criterion is based at least in part on:
  - an analysis of storage-related operations requested from the particular compute instance prior to the one or more rack-level failure events; and
  - a determination of whether state information of the particular compute instance is saved at a local storage device affected by the one or more rack-level failure events;
- in response to a determination that the particular compute instance meets the acceptance criterion, initiate one or more configuration operations to re-launch the particular compute instance at a different instance host.

17. The non-transitory computer-accessible storage medium as recited in claim 16, wherein to determine that the particular compute instance meets the acceptance criterion, the instructions when executed at the one or more processors:
- determine that state information of the particular compute instance is not saved at a local storage device of the first instance host.

18. The non-transitory computer-accessible storage medium as recited in claim 16, wherein to determine that the particular compute instance meets the acceptance criterion, the instructions when executed at the one or more processors:
- determine that (a) state information of the particular compute instance is saved at a local storage device of the first instance host and (b) a remote snapshot of at least a portion of contents of the local storage device comprises valid state information of the particular compute instance that was saved at the local storage device.

19. The non-transitory computer-accessible storage medium as recited in claim 18, wherein the instructions when executed at the one or more processors:
- receive a notification that a write request directed from the particular compute instance has been intercepted by an administrative component of the first instance host; and
- designate, in response to the notification, at least one earlier-generated snapshot as an invalid source of state information pertaining to the compute instance.

20. The non-transitory computer-accessible storage medium as recited in claim 16, wherein the instructions when executed at the one or more processors:
- generate, prior to the detection of the one or more failure events, a plurality of snapshots of at least a portion of contents of one or more local storage devices attached to the first instance host, wherein the portion of contents comprises state information usable to re-launch the particular compute instance at a different instance host.

* * * * *